Dec. 9, 1969                J. G. IVY                3,482,643
SYSTEM TO CONTROL AND DUPLICATE MOVEMENT HYDRAULICALLY
Filed March 18, 1968
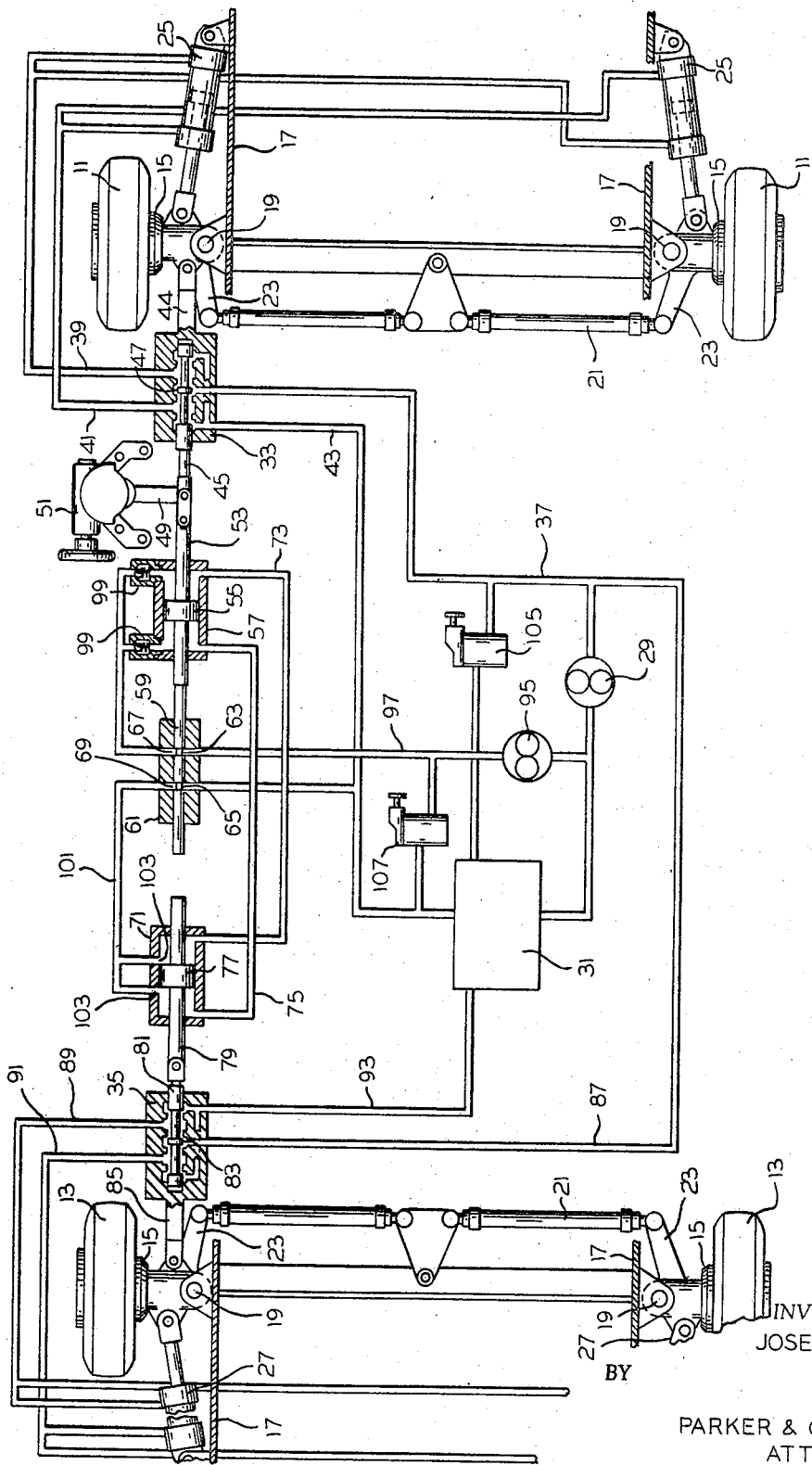
INVENTOR.
JOSEPH G. IVY
BY
PARKER & CARTER
ATTORNEYS United States Patent Office 3,482,643
Patented Dec. 9, 1969

3,482,643
SYSTEM TO CONTROL AND DUPLICATE MOVEMENT HYDRAULICALLY
Joseph G. Ivy, Hinsdale, Ill., assignor to Westinghouse Air Brake Company, Pittsburgh, Pa., a corporation of Pennsylvania
Filed Mar. 18, 1968, Ser. No. 713,849
Int. Cl. B62d 5/00; F15b 15/18, 11/00
U.S. Cl. 180—79.2                                    5 Claims

ABSTRACT OF THE DISCLOSURE

A power steering mechanism for a wheeled vehicle utilizing hydraulic actuating devices to steer the wheels. A steering wheel connects to a first steering valve which controls the flow of hydraulic fluid to one set of hydraulic actuating devices which are connected to one set of steered wheels. The first steering valve is mechanically connected to a piston of a master hydraulic cylinder so that movements of the first steering valve move the master piston. Conduits containing hydraulic fluid connect the master cylinder and a slave cylinder so that movements of the master cylinder piston will displace fluid into the slave cylinder to bring about corresponding movements of the slave piston. The slave piston is mechanically connected to a second steering valve which controls the flow of hydraulic fluid to a second set of hydraulic actuating devices connected to the second set of steered wheels. A synchronizing mechanism, which supplies pressurized hydraulic fluid to the slave piston when the master piston is in a predetermined position at or near the center of its path of movement, is provided to maintain the relative positions of the master and slave pistons to thereby correct nonsynchronization of these pistons due to hydraulic fluid leakage.

Summary of the invention

This invention is concerned with a synchronizing means for applying hydraulic fluid to a slave cylinder to selectively position the slave cylinder piston when a master cylinder piston is in a predetermined position which may be at or near the center of its stroke.

An object of this invention is an apparatus for a hydraulic power steering mechanism which will eliminate errors in correlation between input and output motions due to leakage of hydraulic fluid.

Another object is an apparatus for correcting errors in relative position between the piston of a master cylinder and the piston of a slave cylinder due to hydraulic leakage with the correction being accomplished when the master cylinder piston is at or near the center of its stroke.

Another object is a master-slave piston synchronizing means which purges the system of air when the slave piston is in its zero error position.

Other objects will be found in the following specification, claims, and drawing.

Brief description of the drawing

The invention is illustrated more or less diagrammatically in the following drawing which is a diagrammatic view schematically illustrating a power steering system particularly adapted to a shuttle car.

Description of the preferred embodiment

The drawing shows the invention as applied to a power steering unit on a wheeled vehicle such as a shuttle car. The front wheels 11 of this vehicle and the rear wheels 13 are mounted on spindles 15 which are pivotally connected to a frame 17 by means of pivot pins 19. The wheels of each set are connected together to move in unison by means of tie rods 21 which connect to crank arms 23 attached to the spindles 15.

Pairs of hydraulic linear actuators 25 and 27 are mounted on the car frame 17 and connected respectively to the spindles 15 of the front and rear wheels 11 and 13. The hydraulic actuators are supplied with hydraulic fluid by a pump 29 which draws the fluid from a reservoir 31. Directional flow or steering valves 33 and 35 are provided respectively for the front and rear sets of hydraulic linear actuators 25 and 27. A conduit 37 extends from the pump 29 to the inlet of the directional flow control or steering valve 33. Conduits 39 and 41 lead from the steering valve 33 to the hydraulic actuators 25 with each conduit branching to serve one end of one hydraulic linear actuator and the opposite end of the other hydraulic linear actuator. A return conduit 43 extends from the steering valve 33 to the reservoir 31.

Steering valve 33 is pivotally connected to the spindle 15 of one of the front wheels 11 by a stud 44. A valve spool 45 is mounted in the valve 33 for longitudinal reciprocating movement relative thereto. This valve spool is equipped with a number of lands 47, in this case three, along the length thereof. One end of the valve spool extends outwardly of the valve 33 and is pivotally connected to an operating arm 49 of a steering wheel mechanism 51. The valve spool 45 is also pivotally connected at the same end to a master cylinder piston rod 53. This piston rod connects to a master cylinder piston 55 which is mounted in a master cylinder 57. The opposite end of the piston rod 53 is connected to a valve spool 59 mounted in a valve housing 61. The valve spool 59 is formed with sets of grooves 63 and 65 which permit flow through passages 67 and 69 located respectively in the spool valve housing 61.

A slave cylinder 71 is operatively connected to the master cylinder 57 by conduits 73 and 75. A slave piston 77 is positioned in the slave cylinder for reciprocating movement therein and connects to a slave piston rod 79 which extends outwardly of the slave cylinder. A valve spool 81 is connected to one end of the slave piston rod and this valve spool has a number of lands 83, in this case three, located along the length thereof. The valve spool 81 is positioned in the directional flow control or steering valve 35 which is pivotally connected by a stud 85 to a spindle 15 of one of the rear wheels 13 of the vehicle.

A conduit 87 connects the inlet of the steering valve 35 to the pump 29 which draws hydraulic fluid from the reservoir 31. Conduits 89 and 91 connect outlets of this valve with the hydraulic actuators 27 connected to the spindles 15 of the rear wheels 13. A return conduit 93 runs from the valve 35 to the reservoir 31.

For synchronization of the slave piston with the master piston, a second pump 95, also taking hydraulic fluid from the reservoir 31, is provided. This pump is connected by conduit 97 to passage 67 in the valve housing 61 and from there to opposite ends of the master cylinder 57. Ball check valves 99 are provided in the master cylinder 57 to prevent back flow of hydraulic fluid through the conduit 97. The check valves 99 also insure a working pressure in line 97. They further insure operating pressure in whichever one of lines 73 and 75 is blocked to reservoir 31 by reason of piston 77 blocking one of ports 103, and an out of phase condition exists. A return conduit 101 connects the slave cylinder 71 with the reservoir 31 through the passage 69 in the valve housing 61. Openings 103 in the slave cylinder 71 which connect to the conduit 101 are spaced apart a sufficient distance so as to be located on opposite sides of the piston 77 when the piston is in a predetermined position with the openings being of such size and so positioned that one is closed almost immediately when the pitson 77 moves away from its predetermined position. Pressure relief valves 105 and 107 are provided respectively for the pumps 29 and 95.

The use, operation, and function of this invention are as follows:

This invention is used to maintain synchronization of linear movements between a master cylinder piston and a slave cylinder piston in a closed hydraulic system. It is particularly useful in synchronizing the slave piston when the master piston is at or near the center of its stroke although it can also be arranged to bring about synchronization when the master piston is in some other selected position. If the system is designed so that synchronization takes place when the master cylinder piston is in its normal at rest position, the system may also be utilized to effectively purge air or other entrapped gases from the hydraulic fluid by continually flowing fluid through the master and slave cylinders when the master cylinder piston is in its normal at rest condition.

Assuming for purpose of explanation that the steering mechanism 51 is manipulated so as to turn the front wheels 11 to the left of the vehicle or counter-clockwise as viewed in the drawing, the operating arm 49 attached to the steering mechanism will move the valve spool 45 to the left positioning the lands 47 to block off the outlet 41 and tank return conduit 43 while opening the conduit 39 to fluid supplied from the pump 29. The hydraulic fluid passing from the pump 29 through the conduit 39 will enter the linear actuators 25 to extend one actuator and retract the other to bring about a left or counter-clockwise turning of the front wheels 11. As the wheels 11 turn in this direction, the housing of the steering valve 33 which is connected to the wheel spindle 15 by the stud 44 will be moved to the left as viewed in the drawing to restore the normal or at rest condition of the valve spool 45.

The leftward movement of the valve spool 45, brought about by operation of the steering mechanism 51, is transmitted to the master piston 55 through the master piston rod 53 to move the master piston to the left relative to the master cylinder 57. The leftward movement of the piston 55 will force hydraulic fluid out of the cylinder 57 and through the conduit 75 to the slave cylinder 71 thereby forcing the slave piston 77 to the right as shown in the drawing. Escape of the hydraulic fluid from the slave cylinder through the exhaust conduit 101 will be prevented since leftward movement of the master piston 55 also moves the valve spool 59 in the valve 61 to the left closing the passage 69 in this valve. Movement of the slave piston 77 to the right will force hydraulic fluid through the conduit 73 back to the master cylinder 57.

Movement of the slave piston 77 to the right will also move the valve spool 81, which is connected to the slave piston rod 79, to the right blocking off the flow of hydraulic fluid from the inlet conduit 87 to the outlet conduit 89 and opening the outlet conduit 91. The flow of hydraulic fluid from the pump 29 through the conduit 87 and outlet conduit 91 will admit hydraulic fluid to the linear hydraulic actuators 27 in such a manner as to turn the rear wheels 13 to the right or in a clockwise direction as viewed in the drawing. Turning of the rear wheels 13 in this manner will move the stud 85 and steering valve housing 35 to the right to move the steering valve to its neutral position.

When the steering mechanism is returned to its neutral position in which the sets of wheels 11 and 13 are in their straight ahead condition, the master cylinder piston 55 will be at or near the center of its stroke. Also, the spool 59 in the valve 61 will be positioned so that its grooves 63 and 65 are aligned with the passages 67, 69 permitting the flow of hydraulic fluid through this valve. If under these circumstances the slave piston 77 is not centered between its outlet ports 103, hydraulic fluid from the pump 95 will pass through the groove 63 in the valved spool 59, through the passage 67, through the ball check valves 99, through the master cylinder 57 and then through one of the conduits 73 and 75 to the slave cylinder 71, depending on the non-synchronized position of piston 77. Assuming that the slave piston 77 is off center to the left, the left outlet opening 103 will be blocked causing a build-up of pressure on the left hand side of the piston but the right outlet to opening 103 will be open permitting the continuous flow of fluid through this passage, thus preventing a pressure build-up on the right hand side of the slave piston. The resulting pressure differential will cause the slave piston 77 to move to its centered position. Then the hydraulic fluid in the conduit 101 will flow through the groove 65 and the passage 69 to return to the reservoir 31. Thus, the slave piston will always be maintained in a synchronization with the master piston.

The main pump 29 may operate at a pressure of approximately 500 p.s.i. with its relief valve set at 550 p.s.i. while the synchronization pump 95 may be designed to operate at a pressure of 60 p.s.i. with its relief valve 107 set to operate at 75 p.s.i.

Whereas, one embodiment of the invention as applied to a hydraulic steering system on a shuttle vehicle has been shown and described, it should be understood that various modifications, alterations and additions may be made without departing from the invention's fundamental theme.

I claim:
1. A hydraulic steering system for a vehicle including:
   a first set of wheels steerable by a first hydraulic actuator,
   a first directional control valve for said first hydraulic actuator,
   a second set of wheels steerable by a second hydraulic actuator,
   a second directional flow control valve for said second hydraulic actuator,
   a source of pressurized hydraulic fluid connected to said first and second hydraulic actuators through said first and second directional control valves respectively,
   a hydraulic servo system connecting said first and second directional flow control valves and arranged to move said second control valve upon movement of said first control valve,
   said hydraulic servo system including a master servo connected to said first directional flow control valve and a slave servo connected to said second directional flow control valve, and
   means to synchronize said slave servo with said master servo when said master servo is in a predetermined position.

2. The structure of claim 1 further characterized in that said means to bring said slave servo into synchronization with said master servo includes a second source of pressurized hydraulic fluid and a valve connected to said master servo, said valve being arranged to direct the flow of pressurized hydraulic fluid of said second source to and from said slave servo only when said master servo is in said predetermined position.

3. The structure of claim 2 further characterized in that said slave servo is a hydraulic piston, said second source of pressurized hydraulic fluid is supplied to opposite sides of said slave piston and outlet means from said slave piston are provided to permit escape of equal amounts of hydraulic fluid from each side of said slave piston only when said slave piston is in its synchronized position.

4. The structure of claim 2 further characterized in that said valve is arranged to direct the flow of pressurized hydraulic fluid of said second source to and from said slave servo only when said master servo is in its centered position, 5. The structure of claim 3 further characterized in that said outlet means are spaced apart a distance slightly greater than the length of said slave piston.

References Cited

UNITED STATES PATENTS

| | | | |
|---|---|---|---|
| 2,761,693 | 9/1956 | Stover | 180—79.2 X |
| 3,025,674 | 3/1962 | Cameron-Johnson | 60—54.5 |
| 3,092,201 | 6/1963 | Biek | 180—79.2 |
| 3,212,793 | 10/1965 | Pietroroia | 180—79.2 X |
| 3,323,610 | 6/1967 | Kress et al. | 180—79.2 |

LEO FRIAGLIA, Primary Examiner

J. A. PEKAR, Assistant Examiner

U.S. Cl. X.R.

60—52; 91—411